United States Patent [19]
Frederick

[11] 3,796,425
[45] Mar. 12, 1974

[54] LEDGER HANDLING DEVICE

[75] Inventor: Harold M. Frederick, Birmingham, Mich.

[73] Assignee: Burroughs Corporation, Detroit, Mich.

[22] Filed: Mar. 10, 1972

[21] Appl. No.: 233,562

[52] U.S. Cl................... 271/3, 74/202, 271/DIG. 9
[51] Int. Cl....................... B65h 29/20, F16h 15/00
[58] Field of Search ............. 271/3, 51, DIG. 9, 86; 197/130; 74/202

[56] References Cited
UNITED STATES PATENTS

| | | | |
|---|---|---|---|
| 3,672,664 | 6/1972 | Santirocco et al. | 271/3 |
| 3,669,444 | 6/1972 | Van Namen | 271/3 |
| 3,528,309 | 9/1970 | Laybourn | 74/202 X |
| 651,656 | 6/1900 | Durr | 74/202 |
| 2,823,546 | 2/1958 | Barrett | 74/206 X |
| 3,704,793 | 12/1972 | Nicol et al. | 271/86 X |

FOREIGN PATENTS OR APPLICATIONS

| | | | |
|---|---|---|---|
| 704,081 | 2/1954 | Great Britain | 74/202 |

Primary Examiner—Evon C. Blunk
Assistant Examiner—James W. Miller
Attorney, Agent, or Firm—Edwin W. Uren; Paul W. Fish

[57] ABSTRACT

Provided is a stacking, parking and feeding device associated with a ledger or sheet stacking retainer, the combination feeder and stacker being utilizable in association with the ledger transport apparatus of an accounting machine. Mounted to the front of the accounting machine transport apparatus, the combination device provides feeder means for receiving ledger-type records ejected from the accounting machine and for advanceable feeding such records into the stacking retainer from which they may be manually removed or returned by the feeder means to the transport apparatus for reentry into the accounting machine. The stacking retainer is provided with a stacking position and a park position, the stacking position being accessible for the manual removal of processed records, and the park position representing an intermediate position from which records may selectively be returned by the feeder means to the transport mechanism for continued processing. The feeder means utilized provides a plurality of pressure rollers fixed in opposed relationship to a pair of rotatable parallel shafts, one of the shafts being bi-directionally rotatable by reversible drive means to thereby advance a received record into either the stacking position or the park position of the stacking retainer, or to return a record from the park position to the transport apparatus of the accounting machine.

8 Claims, 5 Drawing Figures

LEDGER HANDLING DEVICE

CROSS-REFERENCE TO RELATED APPLICATIONS

The present invention relates to the ledger handling device disclosed by Edward A. Nicol and Harold M. Frederick in a patent application, Ser. No. 130,583, which was filed on Apr. 2, 1971 and assigned to the assignee of the present application.

BACKGROUND OF THE INVENTION

1. Field of the Invention

This invention relates generally to handling apparatus for web-like articles or ledgers and more particularly to mechanisms for selectively stacking, parking or refeeding these articles or ledgers back into the transport apparatus of an accounting machine for continued processing.

2. Description of the Prior Art

Ledger stacking mechanisms for handling accounting instruments such as ledgers, or the like, are usually part of a ledger processing system or accounting machine in which information is either read from or recorded on ledgers or documents. Drive means are usually provided to drivably advance documents that are ejected from the processing system into a retainer where they are collected and neatly stacked, and from which they may be conveniently removed. When, for example, transactions are to be recorded in customers accounts, appropriate ledgers are usually selected and serially fed into the system or accounting machine. The individual account numbers and old balances may be entered by key depression, or read from a magnetic stripe disposed on the back of the ledger. Following the printing of the account number and old balance on the face of a ledger, the transaction is entered and printed and the new balance automatically computed and printed on the face of the ledger, and perhaps magnetically recorded on the magnetic stripe on the reverse side. As transactions are so recorded on individual ledgers, the ledgers are ejected from the system or accounting machine whereupon they are either fed horizontally into a hopper or vertically into a stacking retainer from which they may not be returned to the system or accounting machine without physical intervention by the operator. Since in individual cases the computation of the new balance frequently requires the interim processing and tabulation of additional ancillary documents, such as sales slips or inventory records, it has been found highly desirable to provide for the temporary ejection and parking of a master document such as the ledger during the time the ancillary documents are being tabulated, and to thereafter recall the master document in order to record the new balance. Known ledger stacking devices have generally failed to provide for the temporary parking and recall of previously ejected documents, it having heretofore been necessary, when the reentry of a document or ledger was required, for the operator to physically select the document from the stack and to then hand feed the document into the machine.

SUMMARY OF THE INVENTION

It is accordingly an object of the present invention to provide a ledger stacking device into which ejected ledgers may be temporarily parked and later recalled for continued processing, and in which fully processed documents may be neatly stacked for convenient removal.

It is another important object of the present invention to provide reversible mechanical drive means that is effective for controllably directing ejected documents in two directions within a stacking retainer, movement in a first direction involving the advancement of ledgers into the retainer and movement in a second direction involving the return of ledgers from the retainer to the accounting machine for continued processing.

In carrying out the object of the invention, a ledger stacking retainer is utilized and mounted in cooperating relationship with the inject and eject throat of the ledger transport mechanism of a business or accounting machine. A plurality of pressure rollers are fixedly mounted on a pair of rotatable parallel shafts which are journaled within the stacking retainer, the pressure rollers and shafts being reversibly rotatable by reversible drive means to thereby advanceably feed an ejected ledger into one of two positions within the stacking retainer, or to return a partially processed ledger from one of these positions to the inject and eject throat. The reversible drive means employed utilizes a pair of oppositely arranged and coaxially aligned solenoids which may be energized by pulses generated by the accounting machine, and an electric motor which may be turned on by switch means disposed on the keyboard of the machine. The electric motor effectively rotates a pair of rotatable members in opposite directions whenever the motor is operating, one of the rotatable members being fixed to the motor shaft and the other being resiliently held in peripheral contact with the motor-driven member. A pivotal lever arrangement having a transfer roller is employed for coupling the transfer roller to a primary drive roller which is fixed to one of the pressure-roller-bearing shafts, the pivotal lever being responsive to the selective energization of the solenoids to thereby couple the transfer roller with one or the other rotatable member to rotate the shafts and pressure rollers in an advancing or return direction. When both solenoids are deenergized, the transfer roller assumes a neutral position relative to the rotatable members, thereby effectively disengaging the primary drive roller and the shafts therefrom, whereupon the shafts and pressure rollers cease to rotate. When rotation of the pressure rollers is terminated at a time when a ledger is held therebetween, the ledger is effectively held in a park position within the stacking retainer, from which it may be recalled for further processing.

BRIEF DESCRIPTION OF THE DRAWINGS

These and other objects, advantages and aspects of the invention will be more clearly understood from the following description when read in conjunction with the accompanying drawing, in which.

DETAILED DESCRIPTION OF THE INVENTION

The present invention is particularly useful for directing ledgers that are ejected from an accounting machine or the like into a ledger stacking retainer and for temporarily holding partially processed ledgers in a park position in the retainer, such ledgers being thereafter automatically returnable to the accounting machine for the finalization of transaction recording.

Figure 1:
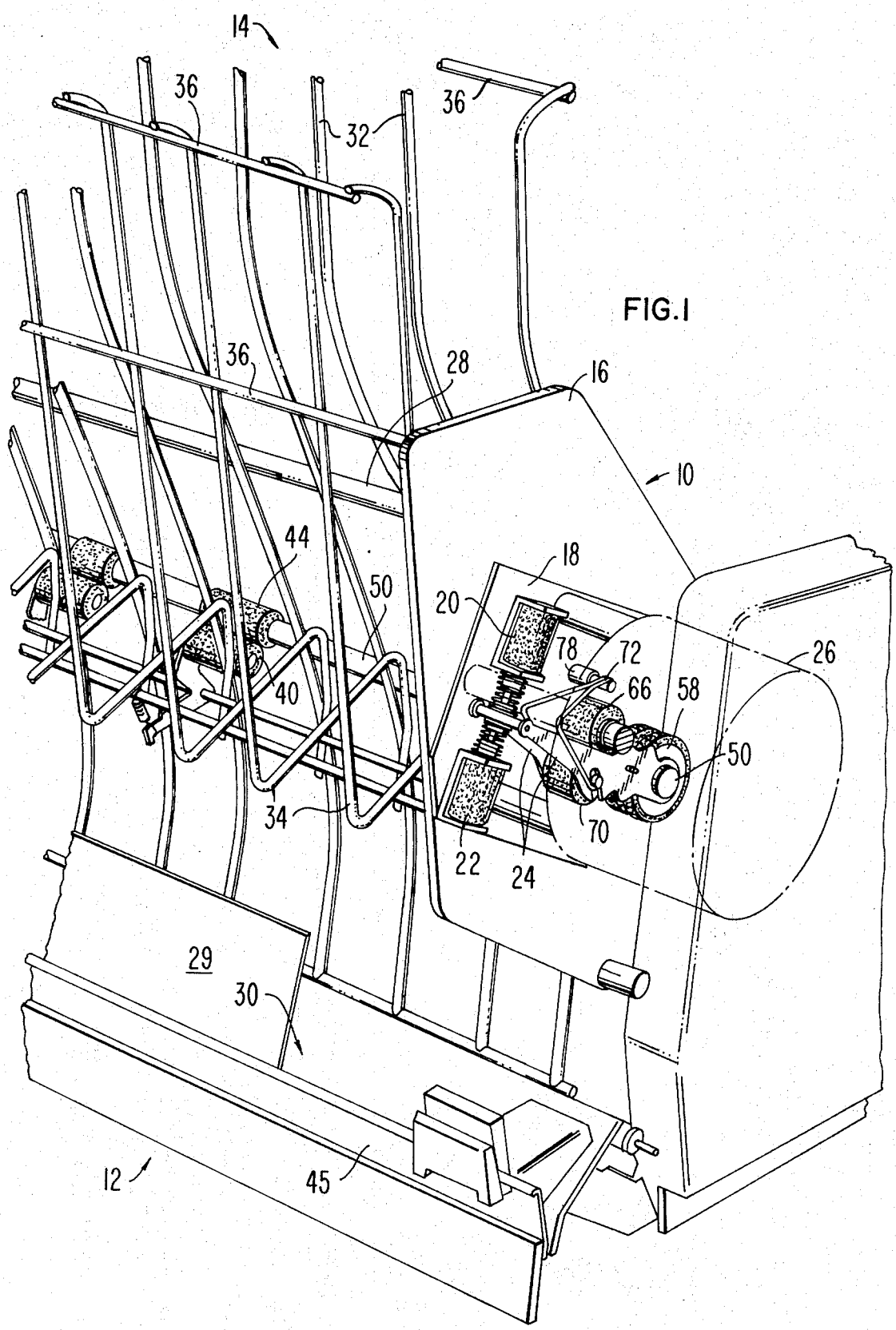
FIG. 1 is a perspective view of the ledger handling device showing the stacking retainer, the ledger engaging means, and various elements of the reversible drive means for advancing and returning ledgers into and out of the retainer.
Figure 2:
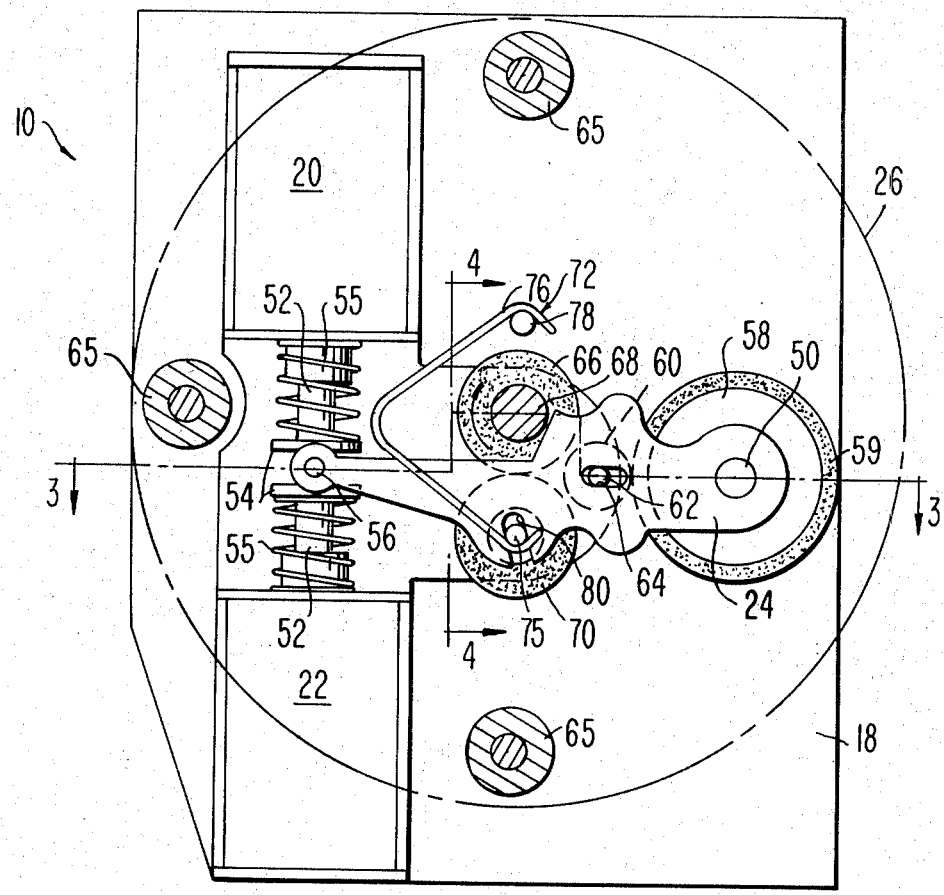
FIG. 2 is an enlarged side view of the device of FIG. 1 showing the detailed construction of the reversible drive means.
Figure 5:
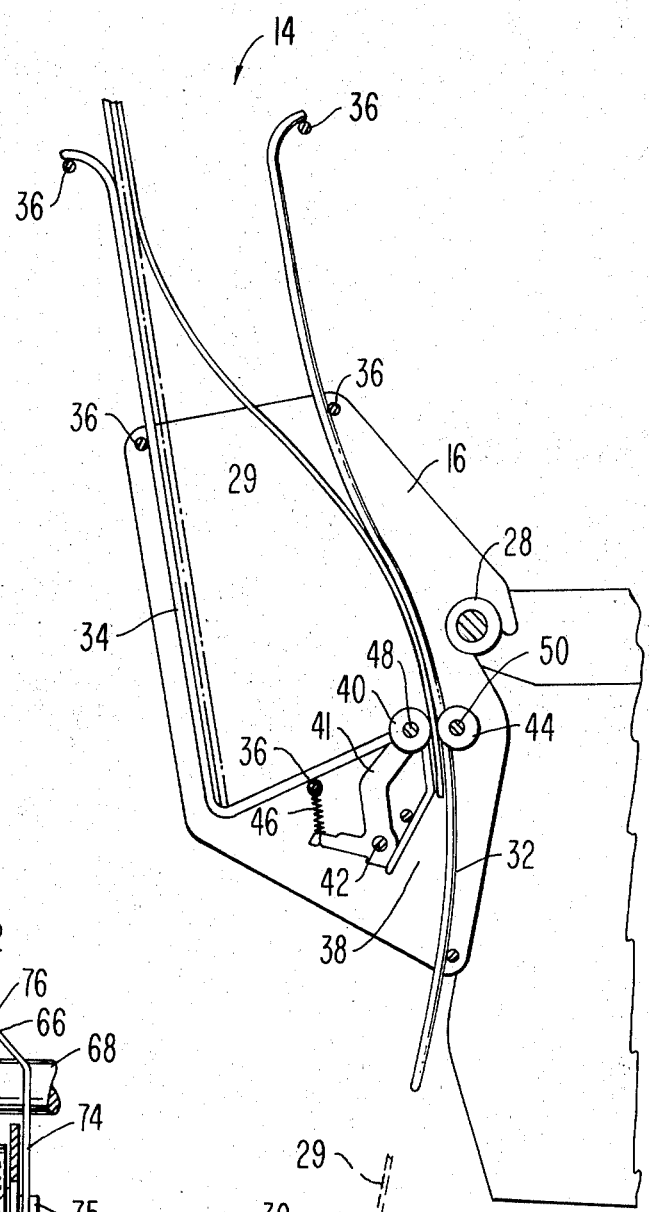
FIG. 5 is a cross-sectional view of the stacking retainer showing a ledger in a parked position wherein its upper edge is in contact with a stack of ledgers and the lower edge is disposed between the driven pressure rollers after having been advanceably driven upwardly in the direction of the stacking retainer.

With reference to the drawings and particularly to FIGS. 1, 2 and 5, there is illustrated a preferred embodiment of the ledger handling device generally designated at 10 in FIGS. 1 and 2. As shown in FIG. 1, the inventive ledger handler is employed in combination with the inject and eject throat 30 of an accounting machine generally designated at 12, the accounting machine having ledger transport capability and a ledger stacking retainer generally indicated at 14. As shown in FIG. 1, the ledger handling device 10 is secured by a mounting plate 18 to one of a pair of upright supports 16. The device includes a pair of axially aligned and oppositely disposed solenoids 20 and 22 mounted on the plate 18, a pair of pivotal and parallel spaced-apart arms 24–24, and an electric motor 26 connected to a hereinafter described roller drive arrangement.

As shown in FIGS. 1 and 5, the stacking retainer 14 is laterally displaced along a mounting bar 28 of the accounting machine such that it assumes a position above a throat 30 thereof for intercepting ejected ledgers 29. As described in the previously mentioned copending application, the retainer 14 is comprised of a sinuous guide 32 and a sinuous stack retainer 34 formed from a plurality of wires or wire-like members longitudinally aligned relative to the direction of ledger travel, the guides 32 and 34 being spaced apart by means of angularly formed portions of the guides 34. A plurality of cross braces 36 connected to the guide members 32 and 34 are provided to lend rigidity to the ledger stacking retainer, at least some of the cross braces being fixed by suitable means to the inner sides of the supports 16—16. The formation of the guide members 34, and particularly the lower portions thereof, provides an opening or throat 38, as best shown in FIG. 5. Adjacent this throat 38 are opposing pressure rollers 40 and 44, the rollers 44 being drivenly rotated by hereinafter described means, and the rollers 40 being idlingly rotatable on a pivotally mounted shaft 48, the shaft 48 being carried by a pair of arms 41 which are rotatably mounted on a stationary shaft 42 and biased in a clockwise or ledger-gripping direction by a pair of springs 46 connected to one of the cross braces 36.

The driven rollers 44 are horizontally supported by a shaft 50 which is journaled in the side supports 16—16 and extends through the rightmost support as shown in FIG. 1. Each of the shafts 48 and 50 carries a like number of driven and idler rollers which are spaced laterally along the throat 38. It can thus be seen that when a ledger 29 is ejected from the inject and eject throat 30 of the accounting machine and driven by the transport system toward the ledger stack retainer, the pressure rollers 40–44 will bite the upper edge of the ledger and drive the ledger upwardly into the stack retainer, assuming that the rollers 44 are being driven in a clockwise direction, as viewed in FIG. 5. It is to be noted that a ledger deflector 45, shown in FIGS. 1 and 5, is provided by and responsively activated in connection with the platen-closing mechanism of the accounting machine, such deflector, although not forming a part of the present invention, is effective, upon closing of the accounting machine platen, to deflect the ejected ledger against the lower extensions of the sinuous guide members 32 and into the throat 38 of the ledger stack retainer 14.

Figure 3:
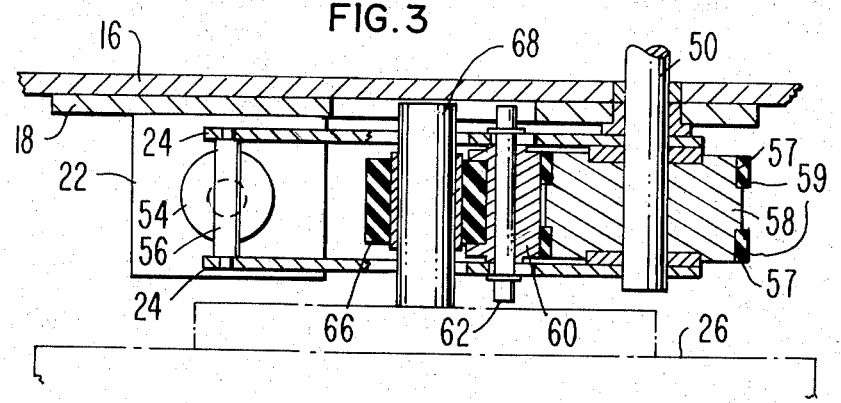
FIG. 3 is a horizontal sectional view taken along the line 3—3 of FIG. 2.

As shown in FIG. 2, the previously mentioned solenoids 20 and 22 mounted on the plate 18 are axially aligned and oppositely disposed such that their armatures 52 are inwardly directed. Each of the armatures is provided with an enlarged end portion 54 which effectively retains a coil or compression spring 55, such spring serving to utwardly extend its associated armature 52 when its associated solenoid is deenergized, and to extend its associated armature a predetermined additional distance when the opposite spring is contracted coincident with the energization of the opposite solenoid. A connecting rod 56, serving to connect corresponding ends of the pivotal arms 24–24, is disposed in interposed relationship with the opposed end portions 54 of the armatures 52, the latter armatures being accordingly effective to bi-directionally pivot the arms 24–24 when the solenoids 20–22 are selectively energized. The opposite ends of the pivotal arms 24–24 are rotatably mounted on the shaft 50, and a transfer roller 60 is translatably carried between these arms by means of its axle 62 being retainably disposed in a horizontal slot 64 formed in each of the pivotal arms. A primary driven roller 58 is fixed to the shaft 50 in interposed relationship with the pair of pivotal arms 24–24, such roller having a pair of rubber strips 59–59 fitted to cutaway edge portions thereof, thereby presenting a slipfree contacting peripheral surface to the transfer roller 60. It is to be noted that the transfer roller 60, as best shown in FIGS. 2 and 3, is provided with a floating action by reason of the horizontal slots 64 formed in the arms 24—24, such floating action providing selective coupling of the primary roller 58 with a pair of hereinafter described rotatable members 66 and 70 when the arms 24—24 are pivoted by the compression springs 55 and solenoids 20–22, and providing an uncoupled relationship between the primary roller 58 and the rotatable members when both solenoids are deenergized and the pivotal arms 24—24 are disposed in a neutral position.

Figure 4:
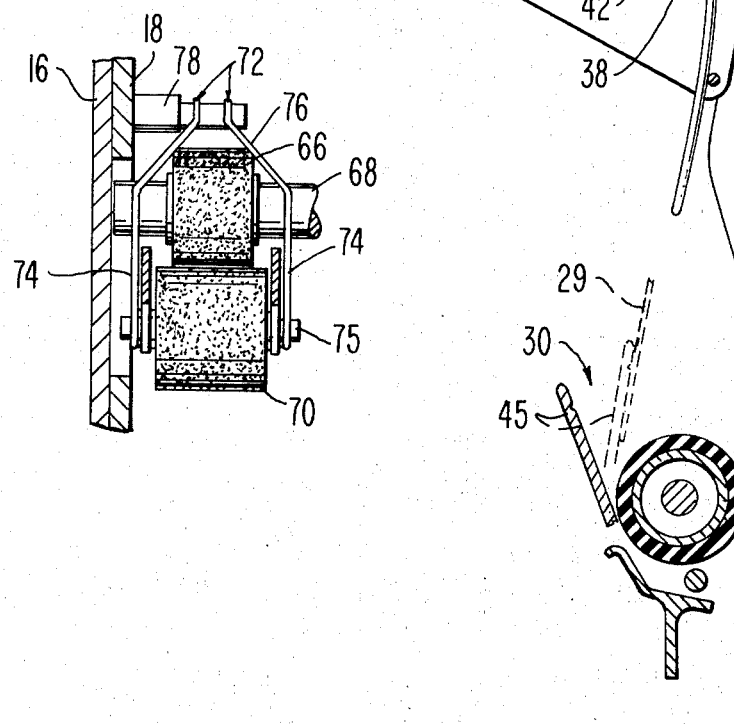
FIG. 4 is a vertical sectional view taken along the line 4—4 of FIG. 2.

As best shown in FIG. 2, the previously mentioned electric motor 26 may be secured to the mounting plate 18 by any suitable means such as by mounting studs 65. The drive roller 66, otherwise referred to as one of a pair of rotatable members, is secured to the armature shaft 68 of the motor 26 and is rotated in a clockwise direction thereby (as viewed in FIG. 2). A portion of the periphery of the roller 66 extends downwardly to a position between the arms 24–24. An idler roller 70, otherwise referred to as a second of the pair of rotatable members, is biased by a spring 72 into peripheral contact with the drive roller 66. The spring 72 is generally U-shaped and angularly formed of resilient wire, the upper end of the spring forming a closed hooked portion and the lower end forming a pair of disconnected hooks, the intermediate portions being bent outwardly in the proximity of the closed hooked portion to form a pair of parallel bent arms 74 disposed outwardly adjacent the pivotal arms 24—24 to thereby function as a cradle for supporting the idler roller 70. As shown in FIG. 4 the upper closed hooked portion of the spring 72, which extends from the bent portions 76, serves to anchor the spring to a stud 78 connected to the plate 18, and the lower disconnected hooked portions of the spring serve to cradle a supporting shaft 75 of the idler roller 70, the effect of the spring 72 being to force the idler roller 70 into constant contact with the periphery of the drive roller 66. To permit this constant contact of the idler roller 70 against the roller 66, and to further provide support for the idler roller 70, an open-ended vertically disposed slot 80 is provided in each of the pivotal arms 24—24, such slots serving to translatably accommodate the ends of the supporting shaft 75 and to permit the bi-directional pivoting movement of the arms 24—24 without causing the idler roller 70 to disengage the drive roller 66.

OPERATION

A typical operation of the inventive ledger handling device may be described in connection with the posting of customer ledgers in an accounts receivable application of an exemplary accounting machine, wherein it may be necessary or desirable to interrupt the posting of an accounts receivable ledger for the tabulation of a plurality of transaction records, such as sales slips, or for the updating of inventory records. When such is the case, a customers ledger would be inserted into the inject and eject throat, as permitted ey the open state of the platen shown in FIG. 5 and as guided by the corresponding angular position of the deflector 45 (solid lines in FIG. 5). Under keyboard control the platen would then be closed and the deflector 45 rotated upward as shown in dotted lines in FIG. 5. Assuming that magnetic stripe ledgers are used, the ledger would be received by the ledger transport means of the accounting machine and automatically injected to the printing line next succeeding the last line of printed information, the customers account number would be read from the stripe and compared with the keyboard entered account number for validation, and the old balance read from the stripe and printed on the printing line. In the event only one transaction slip is to be recorded, the quantity and description of merchandise would be entered by means of the keyboard and printed on the printing line, whereupon the new balance would be computed and printed on the printing line and magnetically recorded on the magnetic stripe. Upon completion of printing and recording the fully processed ledger would be ejected from the accounting machine in a path of travel defined by the deflector 45 and the lower portion of the sinuous guide members 32. Upon entry into the throat 38 of the inventive ledger handling device the ledger would be gripped between the pressure rollers 40-44 and driven fully upward by the electric motor 26, the rotatable member 66, the transfer roller 60, the primary drive roller 58, the shaft 50 and the driven pressure rollers 44, the solenoid 20 having been energized through keyboard control to permit the spring 55 associated with the solenoid 22 to pivot the pivotal arms 24—24 in a clockwise direction (as viewed in FIG. 2). The ledger would be driven upwardly until released by the pressure rollers 40-44, whereupon the ledger would assume a position in the stack as supported by the front sinuous guide members 34.

In the event a number of transaction slips are to be recorded and it is desired to interrupt the posting of the customers ledger in order to utilize the accounting machine for tabulating such slips, or for updating inventory records, the partially processed ledger would be ejected from the accounting machine through keyboard control and advanced through program control to the park position in the stacking retainer, wherein the lower portion of the ledger remains in engaged relationship with the pressure rollers 40-44 which are stopped from rotating, such advancement being accomplished in like manner to the ledger advancement described above. Upon completing the tabulation of the transaction slips or updating of the inventory records, the ledger is returned from the part position to the accounting machine, such return being initiated through keyboard control and accomplished by the energization of solenoid 22, whereupon the pivotal arms 24—24 are rotated in a counterclockwise direction (as viewed in FIG. 2) by the spring 55 associated with the solenoid 20. The transfer roller 60 thereupon couples the primary roller 58, the shaft 50 and the pressure rollers 44. Upon reentry of the partially processed ledger into the accounting machine, the total amount of the transactions is entered in the keyboard of the accounting machine, printed on the printing line and magnetically recorded on the magnetic stripe, whereupon the fully processed ledger is ejected from the machine and directed upwardly into the ledger stacking retainer, as above described in the description of a single transaction posting.

While a particular embodiment of the invention has been shown and described in considerable detail, it is to be understood that many variations thereof may be had without departing from the true spirit and scope of the invention as herein described and claimed. An example of such variation would be the substitution of friction drive belts for the pressure rollers 44—40, as would be obvious to one of ordinary skill in the art, such drive belts cooperating responsively with the bi-directionally rotatable primary driven roller 58 as influenced by the selective activation of the solenoids 20-22 and pivotal arms 24-24.

What is claimed is:

1. A ledger handling device cooperably associated with the ledger transport apparatus of an accounting machine or the like, said transport apparatus including a transversely movable carriage and inject and eject means for transporting ledgers manually inserted into an entrance aperture of said carriage to a processing station and for transporting processed ledgers from said processing station to and through said entrance aperture, said device comprising:

a. a frame structure comprised of a pair of side supports and a plurality of horizontally disposed connecting members, said side supports being detachably connected to said carriage of said accounting machine, b. a ledger stack retainer fixed to side supports and to predetermined ones of said connecting members and comprised of a plurality of angularly formed interconnected vertically disposed wire-like members, c. guide means fixed to said side supports and to predetermined ones of said connecting members and comprised of a plurality of arcuately formed interconnected vertically disposed wire-like members, said guide means being also coplanarly disposed relative to said entrance aperture of said carriage for communication therewith, the lower portions of said arcuately formed members of said guide means cooperating with the lower portions of said angularly formed members of said ledger stack retainer to define a guideway throat therebetween, d. a driven rotatable shaft journaled in said side supports of said frame structure, said driven shaft having a plurality of friction rollers fixed thereto in spaced-apart relationship and extending throughout the horizontal dimension of said stack retainer, e. a pivotally mounted and resiliently biased idling shaft having a plurality of friction rollers rotatably mounted thereon in equal spaced-apart relationship to said friction rollers of said driven shaft, said rollers of said driven shaft being disposed in and on one side of said guideway throat and said rollers of said idling shaft being disposed in and on the opposite side of said guideway throat and biased into frictional contact with said rollers of said driven shaft, f. a single unidirectional motor fixed to and carried by a predetermined one of said side supports of said frame structure, said motor including a motor shaft and a drive roller fixed thereto, and g. reversible coupling means comprised of a primary friction roller fixed to and carried by said driven shaft, an idler roller resiliently supported in frictional contact with said drive roller, pivotal coupling means including a pair of interconnected pivotal arms rockably supported by said driven shaft, and means for pivotally activating said pivotal coupling means such that said pivotal means is frictionally and drivably coupled with either said drive roller or said idler roller to thereby rotate said driven shaft in a first direction to receive the leading edge of a ledger ejected through said entrance aperture of said transport apparatus by said eject means thereof and to advance said ledger through said guideway throat and along said guide means to said ledger stack retainer, and to rotate said driven shaft in a second direction to return a ledger advanced by said first direction rotation into said guideway throat but retained under the control of said driven shaft and said idling shaft, from said guideway throat to said entrance aperture and said inject means of said transport apparatus, said resilient support of said idler roller in frictional contact with said drive roller being accomplished by means of a pair of axially aligned open-ended slots formed in said pair of pivotal arms in radially disposed relationship relative to said drive roller, a generally U-shaped spring including an upper angularly formed closed end and a pair of lower angularly formed open ends, said closed angularly formed upper end serving as a hook for anchoring said spring to said side support carrying said motor by means of a rod fixed thereto, and said lower angularly formed ends presenting a pair of hooks axially aligned with said pair of open-ended slots formed in said pair of pivotal arms, and a first short shaft to which said idler roller is centrally fixed, the extremities of said first short shaft being engaged with said pair of hooks formed by said lower ends of said spring such that said shaft extremities are translatably held within said pair of open-ended slots and said idler roller is biased into frictional contact with said drive roller.

2. The device as defined in claim 1 wherein said pair of interconnected pivotal arms of said pivotal coupling means are rockably supported at corresponding extremities thereof by said driven shaft in straddling relationship relative to said primary friction roller, and wherein said pivotal coupling means additionally comprises:

a. a translatably mounted transfer roller carried by said pair of pivotal arms in cooperable relationship relative to said drive roller and said resiliently supported idler roller, and b. a connecting rod coupling the extremities of said pair of pivotal arms opposite said extremities rockably supported by said driven shaft.

3. The device as defined in claim 2 wherein the translatable mounting of said transfer roller carried by said pair of pivotal arms is accommodated by means of:

a. a pair of axially aligned closed slots formed in said pair of pivotal arms in radially disposed relationship relative to said primary friction roller, and b. a second short shaft to which said transfer roller is centrally fixed, the extremities of said second short shaft being translatably engaged with said pair of closed slots formed in said pair of pivotal arms, the linear dimension and location of said pair of closed slots being such that said transfer roller is disengaged from said primary friction roller and from said drive roller and said idler roller when said pair of pivotal arms are disposed in a neutral non-pivoted position, and frictionally engaged with said primary friction roller and either said drive roller or said roller when said pair of pivotal arms are pivoted by said pivotally activating means, pivoting of said pair of pivotal arms in a first direction serving to frictionally engage said transfer roller with said primary friction roller and said drive roller, and pivoting of said pivotal arms in a second direction serving to frictionally engage said transfer roller with said primary friction roller and said idler roller.

4. The device as defined in claim 3 wherein said means for pivotally activating said pivotal coupling means comprises:

a. an exteriorly controlled first and second solenoid fixed to said side support carrying said motor, the armatures of said solenoids being axially aligned and inwardly directed to provide cooperation with said connecting rod coupling the extremities of said pair of pivotal arms, the extremities of said armatures being provided with enlarged end portions disposed in contacting relationship relative to said connecting rod, and b. a helical spring compressably disposed between a housing portion of each of said solenoids and said enlarged end portion of its corresponding armature, said springs in cooperation with said end portions serving to define a neutral position for said pair of pivotal arms when said first and said second solenoids are de-energized, wherein said transfer roller is disengaged from said primary friction roller and from said drive roller and said idler roller, said spring of said second solenoid serving to pivot said pair of pivotal arms in said first directon when said first solenoid is energized, and said spring of said first solenoid serving to pivot said pair of pivotal arms in said second direction when said second solenoid is energized.

5. A mechanism cooperable with a single unidirectional motor for bidirectionally rotating a driven roller-bearing shaft journaled in a ledger handling device detachably connected to a transversely movable carriage of an accounting machine or the like, said driven roller-bearing shaft frictionally cooperating with a pivotally biased roller-bearing idling shaft to advance ledgers introduced therebetween by eject means of the accounting machine to a ledger stack retainer of said ledger handling device, when said driven shaft is rotated in a first direction, and to return ledgers retained therebetween in a park position to inject means of the accounting machines, when said driven shaft is rotated in a second direction, said mechanism comprising:
   a. a drive roller fixed to the outer extremity of a motor shaft of said motor, said motor forming a part of said ledger handling device and being supported by a frame structure thereof,
   b. a primary friction roller fixed to and carried by said driven shaft,
   c. an idler roller resiliently supported in frictional contact with said drive roller,
   d. pivotal coupling means including a pair of interconnected pivotal arms rockably supported by said driven shaft carrying said primary roller, said means being selectably effective for frictionally and drivably coupling said primary friction roller with either said drive roller or said idler roller upon pivotal activation thereof, and
   e. means for pivotlly activating said pivotal coupling means, said resilient support of said idler roller in frictional contact with said drive roller being accomplished by means of a pair of axially aligned open-ended slots formed in said pair of pivotal arms in radially disposed relationship relative to said drive roller, a generally U-shaped spring including an upper angularly formed closed end and a pair of lower angularly formed open ends, said closed angularly formed upper end serving as a hook for anchoring said spring to said frame structure by means of a rod fixed thereto, and said lower angularly formed ends presenting a pair of hooks axially aligned with said pair of open-ended slots formed in said pair of pivotal arms, and a first short shaft to which said idler roller is centrally fixed, the extremities of said first short shaft being engaged with said pair of hooks formed by said lower ends of said spring such that said shaft extremities are translatably held within said pair of open-ended slots and said idler roller is biased into frictional contact with said drive roller.

6. The mechanism as defined in claim 5 wherein said pair of interconnected pivotal arms of said pivotal coupling means are rockably supported at corresponding extremities thereof by said driven shaft in straddling relationship relative to said primary friction roller, and wherein said pivotal coupling means additionally comprises:
   a. a translatably mounted transfer roller carried by said pair of pivotal arms in cooperable relationship relative to said drive roller and said resiliently supported idler roller, and
   b. a connecting rod coupling the extremities of said pair of pivotal arms opposite said extremities rockably supported by said driven shaft.

7. The mechanism as defined in claim 6 wherein the translatable mounting of said transfer roller carried by said pair of pivotal arms is accommodated by means of:

a. a pair of axially aligned closed slots formed in said pair of pivotal arms in radially disposed relationship with said primary friction roller, and
   b. a second short shaft to which said transfer roller is centrally fixed, the extremities of said second short shaft being translatably engaged with said pair of closed slots formed in said pair of pivotal arms, the linear dimension and location of said pair of closed slots being such that said transfer roller is disengaged from said primary friction roller and from said drive roller and said idler roller when said pair of pivotal arms are disposed in a neutral non-pivoted position, and frictionally engaged with said primary friction roller and either said drive roller or said idler roller when said pair of pivotal arms are pivoted by said pivotally activating means, pivoting of said pair of pivotal arms in a first direction serving to frictionally engage said transfer roller with said primary friction roller and said drive roller, and pivoting of said pivotal arms in a second direction serving to frictionally engage said transfer roller with said primary friction roller and said idler roller.

8. The mechanism as defined in claim 7 wherein said means for pivotally activating said pivotal coupling means comprises:
   a. an exteriorly controlled first and second solenoid fixed to said frame structure of said ledger handling device, the armatures of said solenoids being axially aligned and inwardly directed to provide cooperation with said connecting rod coupling the extremities of said pair of pivotal arms, the extremities of said armatures being provided with enlarged end portions disposed in contacting relationship with said connecting rod, and
   b. a helical spring compressably disposed between a housing portion of each of said solenoids and said enlarged end portion of its corresponding armature, said springs in cooperation with said portions serving to define a neutral position for said pair of pivotal arms when said first and said second solenoids are de-energized, wherein said transfer roller is disengaged from said primary friction roller and from said drive roller and said idler roller, said spring of said second solenoid serving to pivot said pair of pivotal arms in said first direction when said first solenoid is energized, and said spring of said first solenoid serving to pivot said pair of pivotal arms in said second direction when said second solenoid is energized.

* * * * *